May 31, 1966 G. J. FISHER ET AL 3,254,053
TRIOXANE POLYMERIZATION PROCESS AND APPARATUS
Filed Oct. 15, 1962

United States Patent Office 3,254,053
Patented May 31, 1966

3,254,053
TRIOXANE POLYMERIZATION PROCESS AND APPARATUS
Gene J. Fisher, Corpus Christi, Tex., Frank Brown, Berkeley Heights, N.J., and Walter E. Heinz, Frankfurt am Main, Germany, assignors to Celanese Corporation of America, New York, N.Y., a corporation of Delaware
Filed Oct. 15, 1962, Ser. No. 230,645
23 Claims. (Cl. 260—67)

This invention relates to the polymerization of monomers which tend to polymerize as a solid mass and particularly to the polymerization of trioxane in systems containing little or no solvent and apparatus suitable for such polymerization.

It is known that trioxane may be homopolymerized or copolymerized in the presence of certain polymerization catalysts to produce tough, thermally stable and moldable polymers.

When polymerization of liquid phase trioxane takes place in the presence of a highly effective catalyst, conversion to the polymer is substantially complete and the polymer forms as a solid mass filling the entire volume of the reaction mixture. In order to subject the polymer product to washing or other purification procedures the polymer mass must be ground, chopped or pulverized. This is costly and impractical since the polymer is extremely tough. Temperature control in the solidified mass is also difficult.

When a polymerization mixture is diluted with a large amount of an inert solvent, solidification of the reactant mass does not take place. However, it is often preferable, for higher molecular weight products or for more rapid reaction rates, to polymerize reaction mixtures containing little or no solvent.

This invention relates particularly to the polymerization of trioxane in a polymerization mixture containing at least 50 weight percent of trioxane by a method which overcomes the handling difficulties described above.

In general this invention relates particularly to a process for the polymerization of trioxane which comprises preparing a liquid phase of polymerization mixture comprising at least 50 weight percent of trioxane and containing a polymerization catalyst therefor, maintaining said mixture in a polymerization reactor for a period sufficient to convert sufficient trioxane to polymeric form so that a solidified mass would be formed in the absence of a vigorous mixing and shearing action, exerting on said polymerization mixture a vigorous mixing and shearing action throughout the polymerization period and, in a preferred embodiment, blending at least a portion of said polymerization mixture with a portion of the polymerization mixture which has lower polymer content.

The vigorous mixing and shearing action serves to prevent the formation of a solidified mass. To maintain continuous mixing and shearing action as the solid state polymer is formed, sufficient power must be applied to the shearing elements to avoid their becoming frozen or immobilized.

Figure 1:
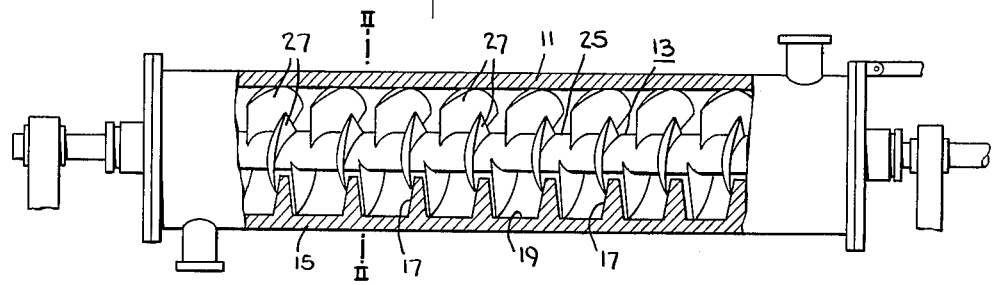
FIGURE 1 shows a somewhat schematic side view, partly in section and partly broken away, of suitable apparatus for imparting a vigorous mixing and shearing action to a polymerization mixture in accordance with one embodiment of this invention.

While a large number of polymerization catalysts for trioxane are suitable, the preferred polymerization catalysts include those containing boron fluoride. Suitable catalysts include boron fluoride, described in U.S. Patent No. 2,989,507 of Hudgin and Berardinelli; boron fluoride coordinate complexes with organic compounds in which oxygen or sulfur is the donor atom, described in U.S. Patent No. 2,989,506 of Hudgin and Berardinelli; boron fluoride coordinate complexes with water, described in application Ser. No. 67,918, filed November 8, 1960, by Hudgin and Berardinelli; and boron fluoride coordinate complexes with basic trivalent nitrogen or phosphorus compounds having ionization constants in water at 25° C. not higher than about $1 \times 10^{-9}$, described in U.S. Patent No. 2,989,511 of Schnizer. Boron fluoride ether complexes, such as boron fluoride dibutyl etherate are especially preferred.

The catalyst is usually admixed with the trioxane in amounts between about 0.0001 and about 0.10 weight percent, based on its boron fluoride content. Preferably, amounts between about 0.0005 and about 0.025 weight percent are used.

Other catalysts are disclosed in an article by Kern et al. in Angewandte Chemie 73 (6), pages 177 to 186 (March 21, 1961).

Particular polymers which may be utilized in this invention include those copolymers having at least one chain containing oxymethylene (—OCH$_2$—) units (usually at least 85 mol percent) interspersed with —O—R— units wherein R is a divalent radical containing at least two carbon atoms directly linked to each other and positioned in the chain between the two valences, with any substituent in the R radical being inert. Preferably such substituents include hydrocarbons, halohydrocarbons, which are inert with respect to formaldehyde under the conditions of polymerization.

Specifically trioxane may be blended with one or more comonomers and particularly with a cyclic ether having adjacent carbon atoms as disclosed in U.S. Patent No. 3,027,352, Walling et al. A particularly preferred class of comonomers are those cyclic ethers having the structure

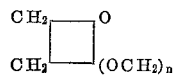

where $n$ is an integer from zero to two.

Among the specific cyclic ethers which may be used are ethylene oxide; 1,3 dioxolane; 1,3,5 trioxepane; 1,3 dioxane; trimethylene oxide; pentamethylene oxide; 1,2 propylene oxide; 1,2 butylene oxide; neopentyl formal; paraldehyde; tetrahydrofuran and butadiene monoxide.

These and other materials may be used with trioxane to form copolymers including terpolymers and higher polymers. For example, the above class of cyclic ethers may be used with polyepoxides and similar materials to form terpolymers as disclosed in U.S. patent application Ser. No. 153,720, filed November 20, 1961, by W. E. Heinz et al.

The copolymers may also incorporate other interspersed monomeric units derived from lactones, carbonates, cyclic acid hydrates or ethylenically unsaturated compounds such as styrene, diformal ether, vinyl acetate, vinyl methyl ketone or acrolein as disclosed in the above mentioned Kern et al. article. The polymers may be end-capped by acylation or esterification after polymerization or during polymerization by the use of selected chain transfer agents. This information is also disclosed in the Kern et al. article.

In forming copolymers, the comonomer is usually used in amounts between about 0.1 and about 20 weight percent, based on the weight of trioxane and preferably in amounts between about 0.1 and about 10 weight percent.

Small amounts of solvents may be used in the process of this invention provided that the reaction mixture contains at least 50 weight percent of trioxane. Among the suitable solvents which may be used are cyclohexane, benzene, ethylene dichloride, pentane, trichloroethylene, ligroin (90–100° C. B. P.), carbon tetrachloride, octane, symmetrical tetrachloroethane, diethyl ether petroleum ether (30–60° C. B. P.) and methylene chloride.

The necessary vigorous mixing and shearing action may be applied to the reaction mass by any apparatus suitable for the kneading of cohesive materials and providing at least partial "back-mixing."

A preferred apparatus for the application of the vigorous mixing and shearing action is shown in FIGURE 1 and includes a continuous mixer 11 having an interrupted thread screw 13 placed in a cylindrical barrel 15. The screw 13 includes a shaft 25 having a plurality of spaced projections 27 thereon which form the interrupted threads. The barrel 15 has rows of teeth 17 on its inner surface 19. The screw 13 and the barrel 15 are movable relative to each other. The screw 13 is both rotated and reciprocated in such a manner that the teeth 17 on the barrel 15 pass between the projections 27 and thereby through the interruptions in the threads of the screw 13. The reaction mass advances through the cylindrical reaction zone in a generally helical path with axial reciprocating movement causing the mass to advance intermittently as it progresses to the discharge point. If desired, heating or cooling coils within the screw 13 and within the walls of the barrel 15 may be used to help control the temperature. The apparatus sold commercially under the name Ko-Kneader and described in U.S. Patent 2,505,125 is suitable.

The reactant mixture is introduced into one end of the cylindrical reaction zone. In order to avoid premature polymerization, the catalyst is not blended with the other ingredients until they are about to enter the cylinder. Or, if desired, the catalyst may be introduced into the cylinder through a separate feed line (not shown).

The polymerization mass is preferably maintained at a temperature between about 0° and about 116° C. after initiation at temperatures above about 60° C. Rotation and reciprocation of the screw 13 maintains a vigorous mixing and shearing action on the reaction mixture and prevents the formation of a solid mass. The reaction mixture changes from a free flowing clear liquid through a progressively thicker slurry and finally to a dry granular solid in a very short period of time. It is discharged as a finely divided powdery product consisting largely of polymer. The reaction time in the cylinder is preferably from about 0.5 to about 10 minutes and most preferably from about 0.5 to about 2 minutes.

The vigorous mixing and shearing action produced by the combined rotation and reciprocation and continued throughout the polymerization period prevents the formation of a solidified mass and produces a final finely divided powder which is easily washed and processed.

In addition, the vigorous mixing and shearing action produced by the combined rotation and reciprocation changes the polymerization reaction itself to produce a polymer which is of considerably higher molecular weight than a batch polymer made from the same reaction mixture at a comparable temperature. The reason for this higher molecular weight is not known.

As the polymerization mixture is conveyed from the charging point to the discharge point of the elongated reaction zone, a portion of the mixture is conveyed from a position farther removed from the charging point to a position closer to the charging point, thereby achieving controlled "back-mixing" or the blending of a first portion of the polymerization mixture having a higher polymer content with a second portion of the polymerization mixture having a lower polymer content.

Figure 3:
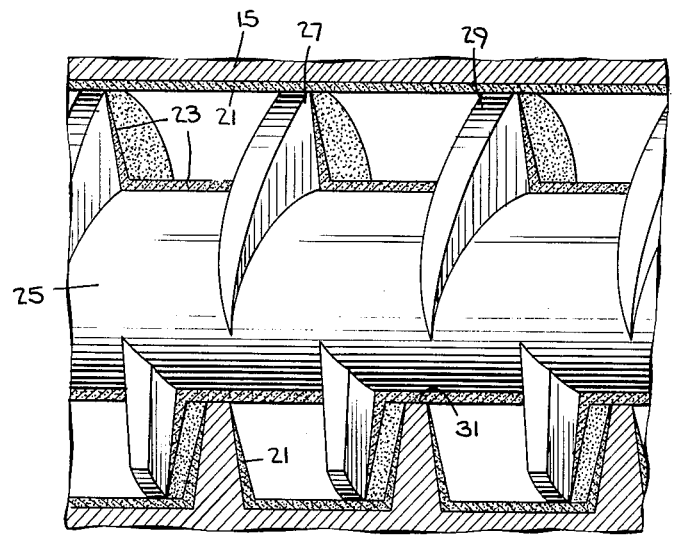
FIGURE 3 shows a perspective view of a portion of the interior of the apparatus of FIGURE 1, including coatings formed in accordance with one embodiment of the invention.
Figure 2:
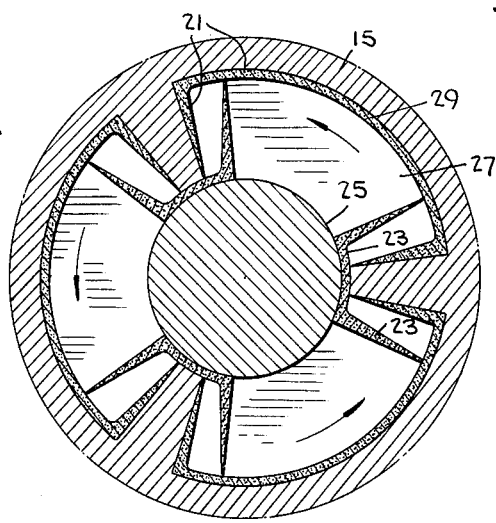
FIGURE 2 shows a sectional view similar to a view taken along lines II—II of the apparatus shown in FIGURE 1, including coatings formed in accordance with one embodiment of the invention.

In FIGURES 2 and 3 there are shown portions of the apparatus shown in FIGURE 1 in which, during the polymerization reaction, a layer 21, 23 of hard polymer is built up on those surfaces of the barrel 15 and screw 13 which do not come in direct wiping contact with each other during their movements. This polymer layer 21, 23 occurs due to the deposition of the polymer formed on the internal portions of the apparatus. If there is no wiping contact between the parts the polymer layer 21, 23 tends to adhere to the apparatus and becomes very hard. This layer 21, 23 can, for example, be a half inch in thickness at some points in the reactor. As seen in FIGURES 2 and 3 the tip portions 29 of the spaced projections 27 are not coated because they are in wiping contact with coated portions of the internal surfaces of the barrel 15. Also the tip portions 31 of the teeth 17 are not coated because they are in wiping contact with coated portions of the shaft 25.

Because of the presence of the coated layer 21, 23, the total area of wiping contact between portions of the barrel 15 and portions of the screw 13 is greatly increased, and the flow of material which by-passes the relatively movable parts is therefore restricted. This aids in maintaining a body of liquid monomer-containing material within the reactor adjacent the inlet end of the reactor and also helps prevent leakage of liquid around the bearing of the screw 13 at said inlet end. To construct a practical reactor of metal having the same dimensions and clearances as characterize the resulting "coated" reactor would be difficult, if not impossible, since on thermal expansion or contraction the contacting metal parts would tend to bind, and since the contacting, relatively movable metal parts would tend to wear, increasing the clearances between such parts. In contrast the "coated" reactor tends to be self-healing; in that there is continuous redeposition of portions of the polymer coating that may be worn off by wiping against an adjacent metal or coated metal part.

While the invention has been described with respect to systems and apparatus using trioxane, it is to be understood that the techniques are applicable to other monomers which tend to polymerize as a hard, friable solid mass.

EXAMPLE I

A mixture of 100 parts by weight of trioxane, 2.4 parts of ethylene oxide, 1.1 parts of cyclohexane, 840 p.p.m. of methylal and 70 p.p.m. of boron trifluoride (as the dibutyl etherate complex) were fed to one end of a continuous mixer similar to that shown in the drawing having an interrupted thread screw placed in a cylindrical barrel.

The temperature in the mixer rose to a maximum of 105° to 115° C. at the discharge point. Residence time in the mixer was about 1 minute. The reaction product was a fine powder.

Other examples are set forth in Table I below. All were treated in apparatus similar to that of Example I. The amounts and periods treated in all samples were such that a solidified mass would have been formed in the absence of the vigorous mixing and shearing action provided. The reaction product in all cases was a fine powder.

*Table I*

|  | 2 | 3 | 4 | 5 | 6 |
| --- | --- | --- | --- | --- | --- |
| Trioxane (parts by weight) | 100 | 100 | 100 | 100 | 100 |
| Ethylene Oxide (parts by weight) | 1.15 | 1.73 | 1.1 | 1.2 | 1.2 |
| Trioxane/cyclohexane (weight ratio) | 96 | 93 | 91 | 45 | 55 |
| Methylal (p.p.m.) | 0 | 0 | 700 | 266 | 276 |
| Catalyst (p.p.m. BF$_3$) | 97 | 109 | 62 | 35 | 44 |
| Polymer Yield (percent) | 85 | 82 | 75 | 56 | 69 |

As noted in Table I the polymer yields vary between 56 and 85%, although in certain instances it may be desirable or necessary to operate at lower yields, such as 40%. However, when there is substantial amount of trioxane which is not utilized in the polymerization reaction, this unreacted trioxane may be recycled in order to increase the yield. Therefore even though the yield on the particular reaction is comparatively low the yield for the entire process, because of the recycle operation, is satisfactory.

This is a continuation-in-part of application Serial No. 100,795, filed April 5, 1961, now abandoned.

It is to be understood that the foregoing detailed description is given merely by way of illustration and that many variations may be made therein without departing from the spirit of our invention.

Having described our invention what we desire to secure by Letters Patent is:

1. A process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action and
    (C) exerting a vigorous mixing and shearing action on said mixture throughout said polymerization period such that
        (1) the formation of a solidified mass is prevented and
        (2) said polymer is in a finely divided form upon leaving said reaction zone.

2. The process of claim 1 wherein the period of step (B) is sufficient to convert said mixture to a polymer in which at least 40 weight percent of the trioxane is in solid polymeric form.

3. A continuous process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action,
        said polymerization reactor comprising plurality of relatively movable members and
    (C) exerting a vigorous mixing and shearing action produced by combined rotation and reciprocation of said relatively movable members on said mixture throughout said polymerization period such that
        (1) the formation of a solidified mass is prevented and
        (2) said polymer is in a finely divided form upon leaving said reaction zone.

4. A continuous process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action,
        said polymerization reactor comprising a plurality of relatively movable members,
    (C) exerting a vigorous mixing and shearing action on said mixture throughout said polymerization period such that
        (1) the formation of a solidified mass is prevented and
        (3) said polymer is in a finely divided form upon leaving said reaction zone and
    (D) depositing, at least during the initial portion of the process, a solid polymer coating on internal portions of said polymerization reactor and on the surfaces of said relatively movable members so that said coated relatively movable members come into direct contact with each other during their movements thereby greatly increasing the area of surface contact between said relatively movable members.

5. A continuous process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action,
        said polymerization reactor comprising a plurality of relatively movable members,
    (C) exerting a vigorous mixing and shearing action produced by combined rotation and reciprocation of said relatively movable members on said mixture throughout said polymerization period such that
        (1) the formation of a solidified mass is prevented and
        (2) said polymer is in a finely divided form upon leaving said reaction zone and
    (D) depositing, at least during the initial portion of the process, a solid polymer coating on internal portions of said polymerization reactor and on the surfaces of said relatively movable members so that said coated relatively movable members come into direct contact with each other during their movements thereby greatly increasing the area of surface contact between said relatively movable members.

6. The process of claim 5 wherein the period of step (B) is sufficient to convert said mixture to a polymer in which at least 40 weight percent of the trioxane is in solid polymeric form.

7. A process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action,
    (C) exerting a vigorous mixing and shearing action on said mixture throughout said polymerization periods such that
        (1) the formation of a solidified mass is prevented and
        (2) said polymer is in a finely divided form upon leaving said reaction zone and
    (D) blending a first portion of said polymerization mixture with a second portion of said polymerization mixture, said second portion having a lower polymer content than said first portion.

8. A continuous process for the polymerization of trioxane which comprises
    (A) preparing a polymerization mixture comprising at least 50 weight percent of trioxane and a polymerization catalyst therefor,
    (B) maintaining said mixture in a polymerization reactor for a period sufficient to convert sufficient trioxane to polymeric form so that a solidified mass would be formed in the absence of a vigorous mixing and shearing action,
        said polymerization reactor comprising a plurality of relatively movable members, (C) exerting a vigorous mixing and shearing action produced by combined rotation and reciprocation of said relatively movable members on said mixture throughout said polymerization period such that
(1) the formation of a solidified mass is prevented and
(2) said polymer is in a finely divided form upon leaving said reaction zone and
(D) depositing, at least during the initial portion of the process, a solid polymer coating on internal portions of said polymerization reactor and on the surfaces of said relatively movable members so that said coated relatively movable members come into direct contact with each other during their movements thereby greatly increasing the area of surface contact between said relatively movable members and
(E) blending a first portion of said polymerization mixture with a second portion of said polymerization mixture, said second portion having a lower polymer content than said first portion.

9. A process for the preparation of a trioxane copolymer which comprises
(A) preparing a polymerization mixture comprising
(1) at least 50 weight percent of trioxane,
(2) at least 0.1 weight percent of a cyclic ether having adjacent carbon atoms and
(3) a polymerization catalyst therefor,
(B) maintaining said mixture in a polymerization reactor for a period sufficient to convert sufficient trioxane to polymeric form so that a solidified mass would be formed in the absence of a vigorous mixing and shearing action,
(C) exerting a vigorous mixing and shearing action on said mixture throughout said polymerization period such that
(1) the formation of a solidified mass is prevented and
(2) said polymer is in a finely divided form upon leaving said reaction zone.

10. A continuous process for the preparation of a trioxane copolymer which comprises
(A) preparing a polymerization mixture comprising
(1) at least 50 weight percent of trioxane,
(2) at least 0.1 weight percent of a cyclic ether having adjacent carbon atoms and
(3) a polymerization catalyst therefor,
(B) maintaining said mixture in a polymerization reactor for a period sufficient to convert sufficient trioxane to polymeric form so that a solidified mass would be formed in the absence of a vigorous mixing and shearing action,
said polymerization reactor comprising a plurality of relatively movable members,
(C) exerting a vigorous mixing and shearing action produced by combined rotation and reciprocation of said relatively movable members on said mixture throughout said polymerization period such that
(1) the formation of a solidified mass is prevented and
(2) said polymer is in a finely divided form upon leaving said reaction zone and
(D) depositing, at least during the initial portion of the process, a solid polymer coating on internal portions of said polymerization reactor and on the surfaces of said relatively movable members come into direct contact with each other during their movements thereby greatly increasing the area of surface contact between said relatively movable members.

11. A process for the preparation of a trioxane copolymer which comprises
(A) preparing a polymerization mixture comprising
(1) at least 50 weight percent of trioxane,
(2) from about 0.1 to about 10 weight percent of ethylene oxide and
(3) from about 0.0001 to about 0.10 weight percent (based on boron fluoride content) of a boron fluoride-containing polymerization catalyst therefor,
(B) maintaining said mixture in a polymerization reactor for a period sufficient to convert sufficient trioxane to polymeric form so that a solidified mass would be formed in the absence of a vigorous mixing and shearing action,
(C) exerting a vigorous mixing and shearing action on said mixture throughout said polymerization period such that
(1) the formation of a solidified mass is prevented and
(2) said polymer is in a finely divided form upon leaving said reaction zone.

12. A continuous process for the preparation of a trioxane copolymer which comprises
(A) preparing a polymerization mixture comprising
(1) at least 50 weight percent of trioxane,
(2) from about 0.1 to about 10 weight percent of ethylene oxide and
(3) from about 0.0001 to about 0.10 weight percent (based on boron fluoride content) of a boron fluoride-containing polymerization catalyst therefor,
(B) maintaining said mixture in a polymerization reactor for a period sufficient to convert sufficient trioxane to polymeric form so that a solidified mass would be formed in the absence of a vigorous mixing and shearing action,
said polymerization reactor comprising a plurality of relatively movable members,
(C) exerting a vigorous mixing and shearing action produced by combined rotation and reciprocation of said relatively movable members on said mixture throughout said polymerization period such that
(1) the formation of a solidified mass is prevented and
(2) said polymer is in a finely divided form upon leaving said reaction zone and
(D) depositing, at least during the initial portion of the process, a solid polymer coating on internal portions of said polymerization reactor and on the surfaces of said relatively movable members so that said coated relatively movable members come into direct contact with each other during their movements thereby greatly increasing the area of surface contact between said relatively movable members.

13. Apparatus for imparting a vigorous mixing and shearing action to a reaction mixture, said apparatus comprising
a cylindrical barrel having internal surfaces,
a screw member positioned within said barrel,
said barrel having a plurality of teeth projecting inwardly from said internal surface,
said screw member having a plurality of interrupted threads,
said screw member and said barrel being relatively movable in both a rotatable and axially reciprocal manner so that said teeth are operable to pass through the interruptions in said threads,
the internal surfaces of said barrel and the surfaces of said screw member which are free from wiping contact with each other being coated with a polymer.

14. Apparatus for imparting a vigorous mixing and shearing action to a polymerization mixture, said apparatus comprising
a cylindrical barrel having internal surfaces,
a screw member positioned within said barrel,
said barrel having a plurality of teeth projecting inwardly from said internal surface,
said screw member having a plurality of interrupted threads, said screw member and said barrel being relatively movable in both a rotatable and axially reciprocal manner so that said teeth are operable to pass through the interruptions in said threads, the internal surfaces of said barrel and the surfaces of said screw member which are free from wiping contact with each other being coated with a polymer.

15. The apparatus of claim 14 wherein said polymer is substantially the same as the polymer formed from said polymerization mixture.

16. Apparatus for imparting a vigorous mixing and shearing action to a polymerization mixture, comprising at least 50 weight percent of trioxane and a polymerization catalyst therefor, said apparatus comprising a cylindrical barrel having internal surfaces,
a screw member positioned within said barrel,
said barrel having a plurality of teeth projecting inwardly from said internal surface,
said screw member having a plurality of interrupted threads,
said screw member and said barrel being relatively movable in both a rotatable and axially reciprocal manner so that said teeth are operable to pass through the interruptions in said threads,
the internal surfaces of said barrel and the surfaces of said screw member which are free from wiping contact with each other being coated with a polymer of trioxane.

17. Apparatus for imparting a vigorous mixing and shearing action to a polymerization mixture, comprising (1) at least 50 weight percent of trioxane,
(2) at least 0.1 weight percent of a cyclic ether having adjacent carbon atoms and
(3) a polymerization catalyst therefor said apparatus comprising a cylindrical barrel having internal surfaces,
a screw member positioned within said barrel,
said barrel having a plurality of teeth projecting inwardly from said internal surface,
said screw member having a plurality of interrupted threads,
said screw member and said barrel being relatively movable in both a rotatable and axially reciprocal manner so that said teeth are operable to pass through the interruptions in said threads,
the internal surfaces of said barrel and the surfaces of said screw member which are free from wiping contact with each other being coated with a oxyalkylene copolymer.

18. The apparatus of claim 17 wherein said polymer is substantially the same as the polymer formed from said polymerization mixture.

19. Apparatus for imparting a vigorous mixing and shearing action to a polymerization mixture, comprising (1) at least 50 weight percent of trioxane,
(2) at least 0.1 weight percent of a cyclic ether having adjacent carbon atoms and
(3) a polymerization catalyst therefor, said apparatus comprising a cylindrical barrel having internal surfaces,
a screw member positioned within said barrel,
said barrel having a plurality of teeth projecting inwardly from said internal surface,
said screw member having a plurality of interrupted threads,
said screw member and said barrel being relatively movable in both a rotatable and axially reciprocal manner so that said teeth are operable to pass through the interruptions in said threads, the internal surfaces of said barrel and the surfaces of said screw member which are free from wiping contact with each other being coated with a copolymer having at least one chain containing oxymethylene ($-OCH_2-$) units interspersed with $-O-R-$ units wherein R is a divalent radical containing at least two carbon atoms directly linked to each other and positioned in the chain between the two valences, with any substituent in the R radical being inert.

20. A process of depositing a polymer coating on the internal surfaces of apparatus for imparting a vigorous mixing and shearing action to a reaction mixture, said process comprising (A) preparing a polymerization mixture,
(B) maintaining said mixture in said apparatus for a period sufficient for the polymerization of at least a portion of said polymerization mixture and for a polymer coating to be deposited upon the internal surfaces of said apparatus, which are free from wiping contact with each other.

21. A process of depositing a polymer coating on the internal surfaces of apparatus for imparting a vigorous mixing and shearing action to a polymerization mixture, said process comprising (A) preparing a polymerization mixture, comprising at least 50 weight percent of trioxane and a polymerization catalyst therefor
(B) maintaining said mixture in said apparatus for a period sufficient for the polymerization of at least a portion of said polymerization mixture and for a trioxane polymer coating to be deposited upon the internal surfaces of said apparatus, which are free from wiping contact with each other.

22. A process of depositing a polymer coating on the internal surfaces of apparatus for imparting a vigorous mixing and shearing action to a polymerization mixture, said process comprising (A) preparing a polymerization mixture, comprising
 (1) at least 50 weight percent of trioxane,
 (2) at least 0.1 weight percent of a cyclic ether having adjacent carbon atoms and
 (3) a polymerization catalyst therefor
(B) maintaining said mixture in said apparatus for a period sufficient for the polymerization of at least a portion of said polymerization mixture and for an oxyalkylene copolymer coating to be deposited upon the internal surfaces of said apparatus, which are free from wiping contact with each other.

23. The process of claim 22 wherein said oxyalkylene copolymer comprises a copolymer having at least one chain containing oxymethylene ($-OCH_2-$) units interspersed with $-O-R-$ units wherein R is a divalent radical containing at least two carbon atoms directly linked to each other and positioned in the chain between the two valences, with any substituent in the R radical being inert.

References Cited by the Examiner

UNITED STATES PATENTS

| | | | |
|---|---|---|---|
| 2,505,125 | 4/1950 | List | 259—99 |
| 2,540,146 | 2/1951 | Stober | 260—95 |
| 2,745,824 | 5/1956 | Melchore | 260—95 |
| 2,894,824 | 7/1959 | Lanning | 260—95 |
| 3,027,352 | 3/1962 | Walling et al. | 260—67 |
| 3,118,859 | 1/1964 | Delassus et al. | 260—67 |

WILLIAM H. SHORT, *Primary Examiner.*

L. M. MILLER, H. D. ANDERSON,
*Assistant Examiners.*